United States Patent [19]

Pierce

[11] Patent Number: 4,588,542
[45] Date of Patent: May 13, 1986

[54] BICYCLE WHEEL ASSEMBLY
[75] Inventor: Owen A. Pierce, Novi, Mich.
[73] Assignee: G. P. Plastics, Inc., Pontiac, Mich.
[21] Appl. No.: 260,416
[22] Filed: May 4, 1981
[51] Int. Cl.⁴ .................. B29C 67/22; B29C 45/16
[52] U.S. Cl. .................................. 264/45.5; 264/45.5;
264/328.12; 264/230; 264/DIG. 5; 264/DIG.
71; 264/DIG. 83; 264/46.9; 301/63 PW
[58] Field of Search ............ 264/46.9, 46.7, DIG. 83,
264/45.5, 328.12, 230, DIG. 71, DIG. 5;
301/63 PW, 64 R, 64 SD, 73, 79

[56] References Cited

U.S. PATENT DOCUMENTS

| | | | |
|---|---|---|---|
| 1,470,048 | 10/1923 | Barker | 264/45.5 X |
| 1,587,486 | 6/1926 | Marshall | 264/45.5 X |
| 1,922,459 | 8/1928 | Schmidt et al. | |
| 2,992,457 | 7/1961 | Harrison | 264/230 |
| 3,178,490 | 4/1965 | Petrino et al. | 264/41 |
| 3,182,104 | 5/1965 | Cwik | 264/45.5 X |
| 3,348,597 | 10/1967 | Golderg et al. | 152/323 |
| 3,377,414 | 4/1968 | Weyer | 264/230 X |
| 3,396,773 | 8/1968 | Alderfer | 152/313 |
| 3,466,700 | 9/1969 | Harrison | 264/DIG. 83 |
| 3,511,736 | 5/1970 | Nielsen et al. | 264/DIG. 83 |
| 3,514,081 | 5/1970 | Cavanaugh et al. | 264/230 X |
| 3,523,918 | 8/1970 | Gonzalez | |
| 3,532,366 | 10/1970 | Rakus et al. | 264/230 X |
| 3,578,812 | 5/1971 | Taussig et al. | 264/230 X |
| 3,586,649 | 6/1971 | Cobbeldick | |
| 3,595,814 | 7/1971 | Lloyd et al. | |
| 3,600,340 | 8/1971 | Patton, Jr. et al. | |
| 3,604,756 | 9/1971 | Gruber | 301/64 SD X |
| 3,646,983 | 3/1972 | Van Lieshoud | 152/323 |
| 3,655,858 | 4/1972 | Wincklhofer et al. | 264/230 |
| 3,664,976 | 5/1972 | Evans | |
| 3,709,965 | 1/1973 | Campbell | 264/45.5 |
| 3,746,665 | 7/1973 | Koleske et al. | |
| 3,824,199 | 7/1974 | Nadeau et al. | |
| 3,854,516 | 12/1974 | Burnell | 152/415 |
| 3,872,201 | 3/1975 | Paul et al. | 264/55 |
| 3,899,454 | 8/1975 | Wagner et al. | |
| 3,925,526 | 12/1975 | Haas | 264/45.5 |
| 3,939,106 | 2/1976 | Dunleavy et al. | |
| 4,033,395 | 7/1977 | Berg et al. | 152/323 |
| 4,060,578 | 11/1977 | Kisbany | 264/46.9 X |
| 4,088,185 | 5/1978 | Carson | 264/230 |
| 4,125,660 | 11/1978 | White et al. | 428/218 A |
| 4,125,691 | 11/1978 | White | 521/51 |
| 4,143,220 | 3/1979 | Müller et al. | 521/129 |
| 4,153,657 | 5/1979 | Wilcox | 264/DIG. 83 |
| 4,164,251 | 8/1979 | Chung | 301/63 PW X |
| 4,206,170 | 6/1980 | Sassaman et al. | 264/45.5 X |
| 4,280,736 | 7/1981 | Raudman | 301/63 PW X |
| 4,333,899 | 6/1982 | Hogan et al. | 264/328.12 |
| 4,350,196 | 9/1982 | Hampshire | 301/63 PW X |
| 4,379,104 | 4/1983 | Koorevaar | 264/DIG. 83 |

FOREIGN PATENT DOCUMENTS 51-39677 10/1976 Japan .......................... 264/DIG. 83

OTHER PUBLICATIONS

B. F. Goodrich Chemical Company Estane Polyurethane Materials Service Bulletin; "Extrusion of Cellular Estane 58018 Black", TSR-63-1 TF 116, Cleveland, Ohio, B. F. Goodrich Co., 9/14/64, One page.
*Whittington's Dictionary of Plastics*, by Lloyd R. Whittington, Stamford, Conn., Technomic, ©1968, preface, pp. 59 and 60.
Wright, P. and A. P. C. Cumming, *Solid Polyurethane Elastomers*, London, MacLaren and Sons, ©1969, pp. 179-191, 303.
Becker, Walter E. *Reaction Injection Molding*, New York, Van Nostrand Reinhold, ©1979, pp. 56-94; 310.
"Encyclopedia of Chemical Technology", edited by Raymond E. Kirk and Donald F. Othmer, New York, The Interscience Encyclopedia, Inc., ©1951, pp. 257-263.

Primary Examiner—Philip Anderson
Attorney, Agent, or Firm—Basile, Weintraub & Hanlon

[57] ABSTRACT

A bicycle wheel assembly prepared by a process comprising the steps of:
(a) Inserting a bicycle rim assembly comprising a central hub, a plurality of radially extending spokes joined to said hub at one end and a rim having a channular cross section joined to the opposed ends of the spokes into a mold cavity configured to form a bicycle tire around the rim;
(b) Injecting a foamable polyurethane composition into said mold cavity;
(c) Foaming and curing the polyurethane composition in the mold cavity; and
(d) Cooling the so-foamed polyurethane composition to cause it to shrink fit around the rim.

2 Claims, 4 Drawing Figures

BICYCLE WHEEL ASSEMBLY

BACKGROUND OF THE INVENTION

1. Field of the Invention

This invention relates, in general, to bicycle wheel assemblies and, more specifically, to bicycle wheel assemblies having a solid or filled tire.

2. Description of the Prior Art

Various types of tires have been devised for mounting on vehicles, such as automobiles, bicycles and the like. Such tires typically include a wheel assembly having a tire formed of a rubber compound mounted thereon. The tire is either of the tubeless or tube type which is inflatable to a predetermined pressure.

Such tires are susceptible to puncture which necessitates repair or replacement. In an effort to overcome such problems, various types of solid or filled tires have been devised. The solid tires are formed of a rubber or plastic compound which is molded into a strip form, cut to length and bonded around a rim or the solid tires are molded into the desired circular shape from suitable plastic materials, such as polyurethane, and placed over a rim. It is also known to mold such solid tires from polyurethane material directly onto a hub wheel assembly by placing an axle into a mold, pouring a polyurethane mixture into the mold and allowing the mixture to set to a solid state as shown in U.S. Pat. No. 3,348,597.

Such tire constructions have also been applied to bicycle wheel assemblies in which a molded, solid tire is formed using polyurethane elastomers to form the tire which is subsequently installed over a conventional rim assembly. Although the use of solid or filled tires on vehicles, and in particular on bicycles, has eliminated punctures and has increased the useful lift of the tires, previous wheel assemblies have been directed towards a separate molding or formation of the tire and rim assemblies, which are subsequently joined together to form the bicycle or vehicle wheel assembly.

A much more desirable wheel assembly for bicycles from manufacturing and end use viewpoints would be a one-piece assembly having a solid or filled tire formed over the rim assembly and it is to this end that the present invention is directed.

SUMMARY OF THE INVENTION

There is disclosed herein a bicycle wheel assembly prepared by a process comprising the steps of:

(a) Inserting a bicycle rim assembly comprising a central hub, a plurality of radially extending spokes joined to said hub at one end and a rim having a channular cross section joined to the opposed ends of the spokes into a mole cavity configured to form a bicycle tire around the rim;

(b) Injecting a foamed polyurethane composition into said mold cavity;

(c) Foaming and curing said polyurethane composition in the mold cavity; and (d) Cooling said polyurethane foam composition to cause it to shrink fit around the rim.

Alternately, the bicycle wheel assembly of the present invention may be constructed by a two-step insert molding process in which the initial steps comprise:

(a) Injecting a thermoplastic material into a mold cavity configured to form a bicycle rim assembly having a central hub, a plurality of radially extending spokes joined to the hub at one end and a rim having a channular cross section joined to the opposed end of the spokes; and (b) Allowing said thermoplastic material to set to a hardened state.

The rim assembly is then inserted into a second mold cavity configured to form a tire around the rim assembly in which the tire is shrunk fit onto the rim by the process described above.

The bicycle wheel assembly constructed according to the process of the present invention is in the form of a single unitary assembly which requires no additional assembly steps, such as the subsequent insertion of a molded tire onto a rim, as in conventional bicycle tire assembly processes. Further, the solid cellular construction of the tire makes it impervious to puncture thereby minimizing repair time during its use and, due to the nature of the polyurethane foam used in the construction of the tire, creates a tire having increased thread life over conventional tires formed of rubber compounds.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
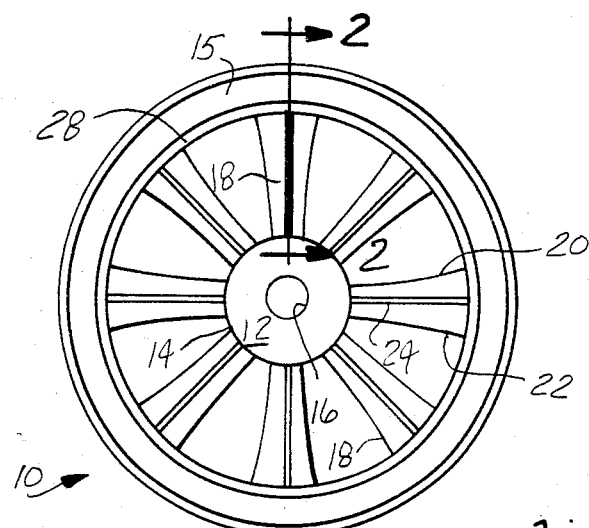
FIG. 1 is an elevational view of a bicycle wheel assembly constructed according to the process of the present invention.

Throughout the following description and drawing, identical reference numbers are used to refer to the same component shown in multiple figures of the drawing.

Figure 2:
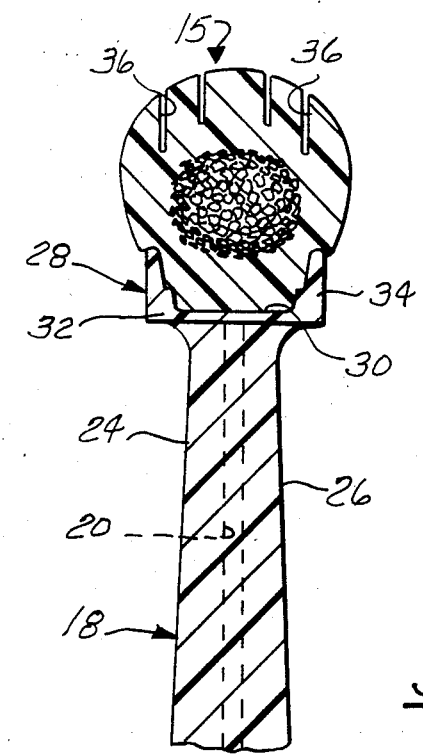
FIG. 2 is a cross sectional view, generally taken along line 2—2 in FIG. 1.
Figure 3:
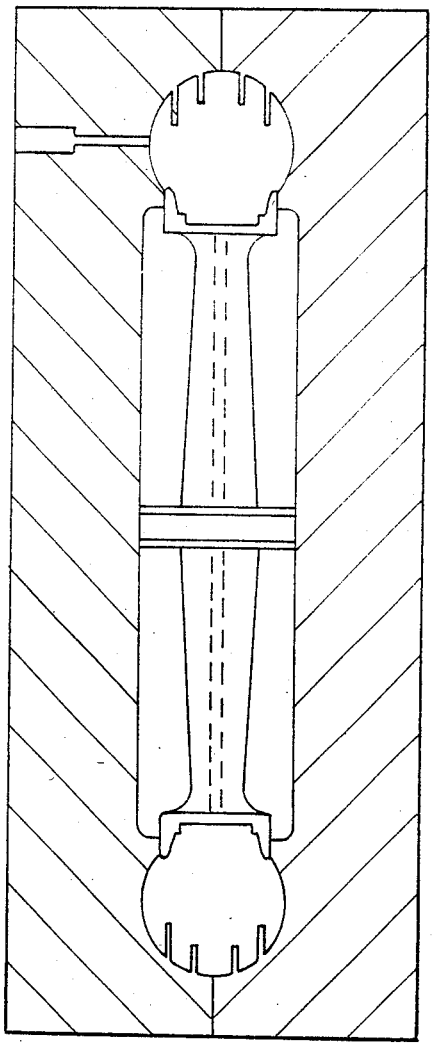
Figure 4:
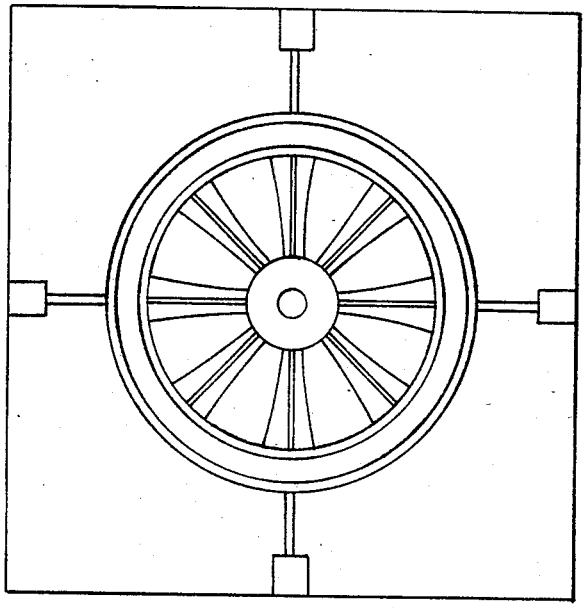

Referring now to FIGS. 1 and 2 of the drawing, there is illustrated a bicycle wheel assembly 10 constructed according to the process of the present invention. In general, the bicycle wheel assembly 10 comprises a rim assembly 12 and a tire 15 mounted thereon.

The rim assembly 12 is formed with a central hub 14 of substantially circular cross section. The hub 14 has a centrally disposed bore 16 formed therein adapted to receive a conventional axle or spindle assembly of a bicycle.

The rim assembly 12 further includes a plurality of radially extending spokes 18 which are integrally formed with the hub 14 and joined thereto at one end. Any number of spokes 18 may be provided, with the only requirement to the exact number of spokes 18 being the number necessary to provide the requisite amount of support for the rim and tire 15. Preferably, the spokes 18 are equally circumferentially spaced about the hub 14.

As shown in FIG. 1, the spokes 18 are configured for use in so-called "off-the-road" or "moto cross" applications. Thus, the spokes 18 have a substantially cross-shaped configuration comprised of four outwardly extending flanges 20, 22, 24 and 26, arranged in opposed pairs.

The rim assembly 2 of the present invention further includes a circular shaped rim 28 having a channular cross section which is joined to the outermost ends of the spokes 18 preferably in an integral manner. As shown in detail in FIG. 2, the rim 28 is formed with a flat base portion 30 to which the outermost ends of the spokes 18 are integrally joined. A pair of upward extending flanges or side walls 32 and 34 are integrally formed at opposed outermost ends of the base portion 30 of the rim 28. The side walls 32 and 34 cooperate with the base portion 30 to define a channel therebetween which extends around the entire circumference of the rim 28.

Although conventional metallic components may be used to form the hub 14, spokes 18 and rim 28, with the spokes threadingly connected to the hub 14 and rim 28 at opposed ends, it is preferred that a one piece, integrally molded rim assembly 12 be formed from a suitable plastic material. Any plastic material having the requisite strength for use in a bicycle wheel application and one which will withstand the pressures and temperatures inherent in an injection molding process may be used to form the rim assembly 12 of the present invention. Further, the plastic material must be capable of being molded into a single unitary assembly. It is preferred that a glass-filled nylon, such as that sold commercially under the registered trademark "Zytel" by the Dupont Corporation, be used to construct the rim assembly 12 of the present invention. Alternately, glass-filled A.B.S. or polycarbonate compounds may also be used. Further, other plastic compounds having the dimensional stability and requisite strength may also be used to form the rim assembly 12 of the present invention.

According to the teachings of the process of the present invention, the tire 15 is injection molded around the rim assembly 28 and is shrunk fit thereon into tight, non-slip engagement with the rim 28.

It is preferred that a polyurethane material and, in particular, a foamable polyurethane composition be used to form the tire 15. Generally, the polyurethane foams are prepared by reacting together an organic polyisocyanate, an active hydrogen containing compound containing at least two active hydrogen-containing groups, as determined by the Zere Witinoff method, in the presence of a catalyst and a suitable blowing agent.

Suitable polyisocyanates include, for example, aromatic diisocyanates, such as, toluene diisocyanate, polymeric diphenyl methane diisocyanate, 4,4'-diphenyl methane diisocyanate, 1,5-naphthalene diisocyanate, and the like and polymethylene diisocyanates, such as, tetramethylene diisocyanate and hexamethylene diisocyanate, quasi-prepolymers and mixtures of such organic polyisocyanates. In practicing the present invention the preferred polyisocyanate is pure methylene diphenyl diisocyanates.

In general, any organic compound containing at least two active hydrogen atoms may be employed in the coating composition for reaction with the polyisocyanate to produce a polyurethane. Examples of suitable types of organic compounds containing at least two active hydrogen groups are castor oil, hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, as well as mixtures thereof.

Any suitable hydroxyl-containing polyester may be used such as are obtained, for example, from polycarboxylic acids and polyhydric alcohols. Any suitable polycarboxylic acid may be used, such as, oxalic acid, malonic acid, succinic acid, glutaric acid, adipic acid, pimelin acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$butyl$\alpha$-ethyl-glutaric acid, $\alpha$-$\beta$-diethylsuccine acid, isophthalic acid, terephthalic acid, hemimellitic acid, and 1, 4-cyclohexane-dicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane 1,2,6-triol, a-methyl glucoside, pentaerythritol and sorbitol. Also includes within the term "polyhydric alcohol" are compounds derived from phenol, such as 2,2-(4,4-hydroxyphenyl) propane, commonly known as Bisphenol A.

Any suitable polyalkylene polyether polyol may be used, such as, the polymerization product of an alkylene oxide or of a mixture of alkylene oxides with a polyhydric alcohol. Any suitable polyhydric alcohol may be used, such as, those disclosed above for use in preparation of the hydroxyl-containing polyesters. Any suitable alkylene oxide may be used, such as ethylene oxide, propylene oxide, amylene oxide, and heteric or block copolymers of these oxides. The polyalkylene polyether polyols may be prepared from other starting materials, such as, tetrahydrofuran and alkylene oxide-tetrahydrofuran copolymers; epihalohydrins, such as, epichlorohydrin; as well as aralkylene oxides, such as, styrene oxide. The polyalkylene polyether polyols may have either primary or secondary hydroxyl groups and, preferably, are polyethers prepared from alkylene oxides having from 2 to 6 carbon atoms, such as polyethylene ether glycols, polypropylene ether glycols and polybutylene ether glycols. The polyalkylene polyether polyols may be prepared by any known process, such as, for example, the process disclosed by Wurtz in 1859 in Encylcopedia of Chemical Technology, vol. 7, pp. 257–262, published by Interscience Publishers, Inc. (1951) or in U.S. Pat. No. 1,922,459.

Typical polyether polyols include polyoxyethylene glycol, polyoxybutylene glycol, polytetramethylene glycol, block copolymers, e.g., combinations of polyoxypropylene and polyoxyethylene glycols, poly-1,2-oxybutylene and polyoxyethylene glycols and poly-1,4-oxybutylene and polyoxyethylene glycols, and random copolymer glycols prepared from blends or sequential addition of two or more alkylene oxides. Also, adducts of the above with trimethylolpropane, glycerine and hexanetriol as well as the polyoxypropylene adducts of higher polyols, such as, pentaerythritol and sorbitol, may be employed. Thus, the polyether polyols which can be employed in this process are oxyalkylene polymers which have an oxygen/carbon atom ratio from about 1:2 to 1:4 and preferably an oxygen/carbon atom ratio from about 1:2.8 to 1:4 and from about 2 to 6 terminal hydroxyl groups and preferably about 2 to 4 terminal hydroxyl groups. The polyether polyols generally have an average equivalent weight from about 150 to 5000 and preferably have an average equivalent weight from about 200 to 2000. Polyoxypropylene glycols having molecular weights from about 400 to 6000 corresponding to equivalent weights from about 200 to 3000 and mixtures thereof are particularly useful as polyol reactants. Also, polyol blends such as a mixture of high molecular weight polyether polyols with lower molecular weight polyether polyols or monomeric polyols can be used in preparing the polyurethane.

Any suitable polyhydric polythioether may be used, such as, for example, the condensation product of thiodiglycol or the reaction product of dihydric alcohol, such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol, such as, ethanolamine, with the polycarboxylic acids set forth above or they may be made using the same components that make up the hydroxyl-containing polyester with only a portion of the components being a diamine, such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used, such as, for example, the reaction product of formaldehyde or other suitable aldehyde with a dihydric alcohol or an alkylene oxide such as those disclosed above.

Other components which do not necessarily fit within any of the previously set forth classes of compounds which are quite suitable in the compositions of the present invention include the hydroxy-terminated polyurethane polymers, such as, a hydroxy-terminated polymer made by reacting an isocyanate with several moles of an alkylene glycol, such as propylene glycol modified crude methylene diphentl diisocyanate.

In practicing the present invention the active hydrogen compound is preferably a polyester. Particularly suitable is polycaprolactone.

A conventional catalyst of the type normally used in the prior art for reacting isocyanates with active hydrogen-containing compounds to produce polyurethanes is preferably incorporated in the composition of this invention to increase the conversion rate of the system. The amount of the catalyst generally corresponds to about 0.01 to 5.0% of the combined weight of the polyisocyanate and the active hydrogen-containing compound. Suitable catalysts for this purpose include diethylene triamine ketimine, tetramethylethylene diamine, triethylene diamine, tetramethyl-butane diamine, tetramethyl guanidine, trimethyl piperazine and metalloorganic salt catalysts which are polyvalent metal salts of an organic acid having up to about 18 carbon atoms. The organo portion of the salt may be either linear or cyclic and saturated or unsaturated. The polyvalent metal has a valence from about 2 to 4. Typical metalloorganic salts include stannous acetate, stannous butyrate, stannous 2-ethylhexoate, stannour laurate, stannous oleate, stannous stearate, lead cyclopentane carboxylate, cadmium cyclohexane carboxylate, lead naphthenate, lead octoate, cobalt naphthenate, zinc naphthenate, bis(phenylmercury) dodecenyl succinate, phenyl mercuric benzoate, cadmium naphthenate, phenyl mercuric acetate, phenyl mercuric propionate, dibutyltin dilaurate, dibutyltin-di-2-ethylhexoate, phenyl mercury decanoate, di(phenyl mercuric) dodecenyl succinate and the like.

In addition to the principle components other additives or ingredients which may be employed in the formulation in order to impart special properties to this composition include fillers and pigments. The amount of filler preferably ranges from about 20 to 120% of the total weight of the composition and the amount of pigment ranges from about 3 to 100% of the total weight of the composition. Examples of suitable fillers are aluminum silicate, calcium silicate, magnesium silicate, calcium carbonate, barium sulfate, calcium sulfate, carbon blacks, silica and the like.

Useful blowing agents include, for example, the typical halo-hydrocarbons well known to the skilled artisan, including the chlorinated and chlorofluorinated hydrocarbon, and other low temperature boiling cell-forming agents. Likewise, hydrogen blowing agents, such as hydrazides, azodicarbonamides and the like can be used.

In practicing the present invention it has been found that a solid polyurethane foam composition is particularly useful and, in particular, a polyester polyurethane composition, based on pure methylene diphenyl diisocyanate and polycaprolactone. Such systems are known and commercially available such as the pellethane 2102 compounds sold by Upjohn Co.

When using a solid system a solid or liquid blowing agent is, also, employed, such as an azodicarbonamide, or the like.

As is well known, in a reaction injection molding process, a polyurethane foam composition is injected into a suitable mold cavity as a two part system where, in the mold, foam formation of a reactant and blowing agent occurs. Further, upon contact with the surface of the mold, the polyurethane foam composition forms an outer skin of closed cell configuration; while the interior of the tire 15 may be formulated in an open cell configuration or be completely devoid of any materials so as to form a cavity throughout the entire circumference of the tire 15.

According to the process of the present invention, the rim assembly 12 formed as described above is inserted into a mold cavity configured to form the tire 15 around the rim 28. The polyurethane foam composition is then injected into the mold cavity. The polyurethane is allowed to cure to a solid or hardened state and then cooled to cause the foamed polyurethane to shrink around the rim 28 into a tight, non-slip engagement. In this manner, a unitary bicycle wheel assembly 10 is formed.

In practicing the present invention, molding is, ordinarily conducted at a temperature ranging from about 375° F. to about 450° F., and, preferably from about 400° F. to about 440° F. Molding is conducted at a pressure of from about 200 psi to about 2000 psi, and, preferably from about 500 psi to about 750 psi. Usually, the foaming and curing will occur in about three to about ten minutes.

Preferably, the bicycle wheel assembly 10 of the present invention is formed in a two-step insert molding process in which the rim assembly is first formed in a first mold, allowed to harden to a solid state and then inserted into a second mold configured to form the tire 15 therearound. According to this two-step process a first mold is formed having the configuration of a central hub 14, a plurality of radially extending spokes 18 and an outermost channular rim 28. A suitable thermoplastic material is injected into the first mold and allowed to set to a hardened state to form the rim assembly 12 illustrated in FIG. 1. The rim assembly 12 is then remved from the first mold and inserted into a second mold having an outermost configuration of the tire 15.

The polyurethane foam composition is then injected into the second mold and allowed to set to a hardened or cured state to form a tire 15 which is shrunk fit over the rim 28 of the rim assembly 12 to form the complete, unitary bicycle wheel assembly 10 of the present invention.

The second mold used to form the tire 15 may also be constructed to form a suitable pattern comprising a plurality of grooves 36 arranged in a predetermined pattern about the outermost periphery of the tire 15 in order to increase traction and maneuverability of the bicycle wheel assembly 10 in use.

For a more complete understanding of the present invention reference is made to the following illustrative example.

EXAMPLE

Into an injection mold maintained at 425° F. and 700 psi, and in which is positioned a thermoplastic bicycle rim, is charged 100 parts of about 1.1 stoichiometric homogenous solid pellet of a polycaprolactone and pure methylene diphenyldiisocyanae. The pellet also contains a polyurethane catalyst. Also charged into the mold is 0.3 parts of liquid azadicarbonamide. After about five minutes form formation and curing is achieved, the mold is permitted to cool to room temperature. There is, thus, attained a shrink fit tire molded about the rim.

Visual inspection of the cross-section of the tire reveals an open-celled interior and a compact elastomeric outer skin.

Thus, there has been disclosed a bicycle wheel assembly prepared by an injection molding process which forms a single, unitary wheel assembly having a solid tire shrunk fit over the rim of the wheel assembly. The solid tire is impervious to puncture and, due to the formulation of the polyurethane foam composition used in this construction, has increased thread and wear life which increases the useful life of the bicycle wheel assembly constructed accoording to the process of the present invention.

Having, thus, described the invention what is claimed is:

1. A process of manufacturing a bicycle wheel and tire assembly comprising the steps of:

inserting a bicycle wheel assembly comprising a central hub, a plurality of radically extending spokes joined to said hub at one end and a rim having a channnular cross-section oriented away from the central hub joined to the outermost ends of said spokes into a mold cavity configured to form a bicycle tire around said rim; such that the channular rim defines one wall of the mold cavity;

injecting a foamable polyurethane composition into said mold cavity;

foaming and curing said polyurethane composition in said mold cavity causing said polyurethane composition to come into contact with the outer surfaces of said mold cavity thereby forming a dense polymeric structure at the rim and outer edges and a lower density core; and cooling said polyurethane composition to cause it to shrink fit about said rim to form a unitary tire and wheel assembly.

2. The process of claim 1 including the steps of:

injecting a thermoplastic material into another mold cavity configured to form a bicycle rim assembly having a central hub, a plurality of radially extending spokes joined to said hub at one end a rim having a channnular cross-section jointed to the outer ends of said spokes; and allowing said thermoplastic material to set to a solid state, prior to forming the tire unitarily therewith.

* * * * *